United States Patent
Kim et al.

(10) Patent No.: US 10,054,813 B2
(45) Date of Patent: Aug. 21, 2018

(54) LIQUID CRYSTAL DISPLAY DEVICE HAVING REDUCED DRIVING VOLTAGE

(71) Applicant: Samsung Display Co. Ltd., Yongin (KR)

(72) Inventors: Hoon Kim, Ansan-si (KR); Gee Bum Kim, Suwon-si (KR); Ki Chul Shin, Seongnam-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/163,475

(22) Filed: May 24, 2016

(65) Prior Publication Data
US 2017/0082878 A1    Mar. 23, 2017

(30) Foreign Application Priority Data
Sep. 22, 2015    (KR) .................. 10-2015-0133509

(51) Int. Cl.
  *G06F 3/041*    (2006.01)
  *G02F 1/1334*   (2006.01)
  *G02F 1/1343*   (2006.01)
  *G02F 1/1333*   (2006.01)

(52) U.S. Cl.
  CPC ...... *G02F 1/1334* (2013.01); *G02F 1/133345* (2013.01); *G02F 1/134309* (2013.01)

(58) Field of Classification Search
  CPC ............. G02F 1/1334; G02F 1/133345; G02F 1/134309
  See application file for complete search history.

(56) References Cited

U.S. PATENT DOCUMENTS

| | | | | |
|---|---|---|---|---|
| 2008/0048989 A1* | 2/2008 | Yoon | ................... | G02F 1/13338 345/173 |
| 2010/0151228 A1* | 6/2010 | Chin | ....................... | B32B 27/08 428/323 |
| 2012/0113363 A1* | 5/2012 | Lim | ....................... | G02F 1/1334 349/96 |
| 2015/0042934 A1 | 2/2015 | Kanno et al. | | |

FOREIGN PATENT DOCUMENTS

| KR | 101506328 | 3/2015 |
|---|---|---|
| KR | 1020150047660 | 6/2015 |

OTHER PUBLICATIONS

Seung-Gon Kang, "Optically-isotropic nanoencapsulated liquid crystal displays based on Kerr effect", Optics Express, (Jul. 1, 2013), vol. 21, No. 13, pp. 15719-15727.

* cited by examiner

*Primary Examiner* — Tracie Y Green
(74) *Attorney, Agent, or Firm* — Cantor Colburn LLP

(57) ABSTRACT

A liquid crystal display device includes a first substrate, a second substrate facing the first substrate, a liquid crystal capsule layer disposed between the first substrate and the second substrate, a first field-generating electrode disposed on a first surface of the first substrate facing the second substrate, a second field-generating electrode disposed on a first surface of the second substrate facing the first substrate, and a first insulating layer disposed between the first field-generating electrode and the liquid crystal capsule layer or between the second field-generating electrode and the liquid crystal capsule layer, wherein the liquid crystal capsule layer includes a conductive buffer layer and a plurality of liquid crystal capsules, which are distributed in the conductive buffer layer.

19 Claims, 5 Drawing Sheets

LIQUID CRYSTAL DISPLAY DEVICE HAVING REDUCED DRIVING VOLTAGE

This application claims priority to Korean Patent Application No. 10-2015-0133509 filed on Sep. 22, 2015, and all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device.

2. Description of the Related Art

A liquid crystal display ("LCD") device, which is one of the most widely-used flat panel display devices, includes field-generating electrodes such as pixel electrodes and a common electrode, two substrates having a gap therebetween, and a liquid crystal layer filing the gap between the two substrates. The LCD device applies a voltage to the field-generating electrodes so as to generate an electric field in the liquid crystal layer, determines the alignment of liquid crystal molecules, and adjusts the polarization of incident light, thereby displaying an image.

An LCD device with a liquid crystal layer provided in the form of a plurality of liquid crystal capsules may be advantageous in that it may minimize image distortion that may be caused in response to the LCD device being bent or pressure being applied to the surface of the LCD device.

SUMMARY

A liquid crystal display ("LCD") device with a liquid crystal layer provided in the form of a plurality of liquid crystal capsules may undesirably have a high driving voltage.

Exemplary embodiments of the invention provide an LCD device which reduces a driving voltage.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, there is provided a liquid crystal display device. The liquid crystal display device includes a first substrate, a second substrate facing the first substrate, a liquid crystal capsule layer disposed between the first substrate and the second substrate, a first field-generating electrode disposed on a first surface of the first substrate facing the second substrate, a second field-generating electrode disposed on a first surface of the second substrate facing the first substrate, and a first insulating layer disposed between the first field-generating electrode and the liquid crystal capsule layer or between the second field-generating electrode and the liquid crystal capsule layer, wherein the liquid crystal capsule layer includes a conductive buffer layer and a plurality of liquid crystal capsules, which are distributed in the conductive buffer layer.

According to an exemplary embodiment of the invention, there is provided a liquid crystal display device. The liquid crystal display device includes a first substrate, a second substrate facing the first substrate, a liquid crystal capsule layer disposed between the first substrate and the second substrate, a first field-generating electrode disposed on a first surface of the first substrate facing the second substrate, a second field-generating electrode disposed on the first surface of the first substrate and spaced from the first field-generating electrode, and an insulating layer covering the first field-generating electrode and the second field-generating electrode, wherein the liquid crystal capsule layer includes a conductive buffer layer and a plurality of liquid crystal capsules, which are distributed in the conductive buffer layer.

According to the exemplary embodiments, it is possible to provide an LCD device which reduces a driving voltage and having an improved response speed.

Other features and exemplary embodiments will be apparent from the following detailed description, the drawings, and the claims.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this invention will be thorough and complete and will fully convey the concept of the invention to those skilled in the art, and the invention will only be defined by the appended claims. Like reference numerals refer to like elements throughout the specification.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the application belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Like reference numerals refer to like elements throughout the specification.

Exemplary embodiments of the invention will hereinafter be described with reference to the accompanying drawings.

Figure 1:
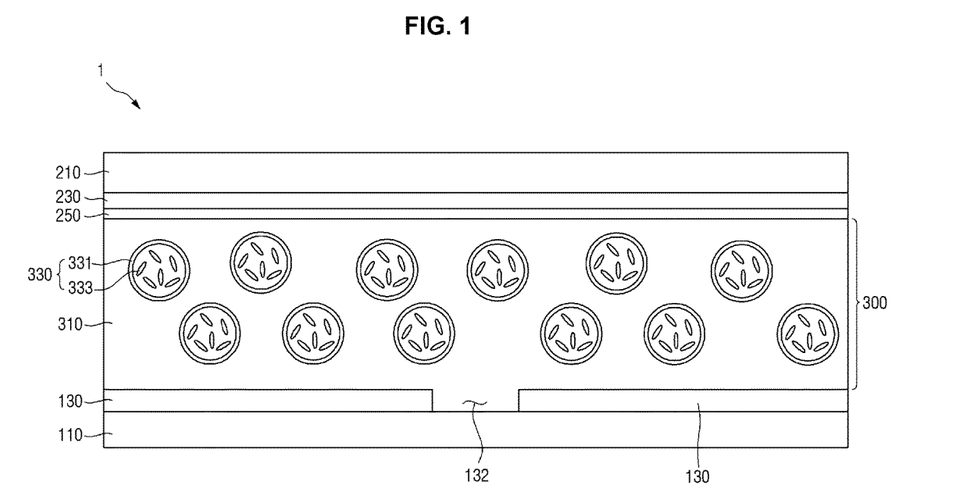
FIG. 1 is a cross-sectional view of a liquid crystal display ("LCD") device according to an exemplary embodiment of the invention.

FIG. 1 is a cross-sectional view of a liquid crystal display ("LCD") device according to an exemplary embodiment of the invention.

Referring to FIG. 1, an LCD 1 may include a first substrate 110, a second substrate 210, a first field-generating electrode 130, a second field-generating electrode 230, a first insulating layer 250, and a liquid crystal capsule layer 300. The LCD 1 may also include a pair of polarizers (not illustrated), which are respectively attached on the outer surfaces of the first substrate 110 and the second substrate 210.

The first substrate 110 may include a first insulating substrate. In an exemplary embodiment, the first insulating substrate may be a glass substrate, a quartz substrate, a transparent resin substrate, or the like, for example. In an exemplary embodiment, the first insulating substrate may include a polymer or a plastic material with high thermal resistance, for example. In exemplary embodiments, the first insulating substrate may have flexibility. That is, the first insulating substrate may be deformable through rolling, folding or bending.

A plurality of pixel regions (not illustrated) for displaying an image may be provided on the first substrate 110. In an exemplary embodiment, wires such as gate lines, data lines, and the like and switching devices such as thin-film transistors ("TFTs") and the like may be disposed in the pixel regions of the first substrate 110.

The first field-generating electrode 130 may be disposed on a first surface of the first substrate 110 facing the second substrate 210. In an exemplary embodiment, the first field-generating electrode 130 may be a pixel electrode disposed in a pixel region and receiving a data signal via a wire such as a data line, for example. The first field-generating electrode 130 may include a transparent conductive material transmitting light therethrough. In an exemplary embodiment, the first field-generating electrode 130 may include a transparent conductive material such as indium tin oxide ("ITO"), indium zinc oxide ("IZO"), zinc oxide, tin oxide, fluorine-doped tin oxide ("FTO"), and the like, for example.

In exemplary embodiments, at least one slit 132, and particularly, a plurality of slits 132 may be defined in the first field-generating electrode 130.

In an exemplary embodiment, the second substrate 210, similarly to the first substrate 110, may include a second insulating substrate, which includes glass, a transparent polymer, or the like, for example. In exemplary embodiments, the second insulating substrate may have flexibility. That is, the second insulating substrate may be deformable through rolling, folding or bending.

In exemplary embodiments, color filters (not illustrated) may be disposed on the second substrate 210, and the color filters may include a red color filter realizing red light, a green color filter realizing green light, and a blue color filter realizing blue light. However, the invention is not limited to this. That is, in an alternative exemplary embodiment, the color filters may be disposed on the first substrate 110.

The second field-generating electrode 230 may be disposed on a first surface of the second substrate 210 facing the first substrate 110. The second field-generating electrode 230 may include a transparent material transmitting light therethrough. In an exemplary embodiment, the second field-generating electrode 230 may include a transparent conductive material such as ITO, IZO, zinc oxide, tin oxide, FTO, and the like, which may be used alone or by being mixed with one another, for example. In an exemplary embodiment, the second field-generating electrode 230 may be a common electrode, which is applied commonly to all the pixel regions, for example.

In exemplary embodiments, the second field-generating electrode 230 may be provided on the first surface of the second substrate 210 as a plate with no particular slits, but the invention is not limited thereto. That is, in an alternative exemplary embodiment, slits may be defined in the second field-generating electrode 230.

The first insulating layer 250 may be disposed between the liquid crystal capsule layer 300 and the second field-generating electrode 230. The liquid crystal capsule layer 300 may include a conductive buffer layer 310, and the first field-generating electrode 130 and the second field-generating electrode 230 may be electrically connected by the conductive buffer layer 310. The first insulating layer 250 may be disposed between the liquid crystal capsule layer 300 and the second field-generating electrode 230 and may thus insulate the liquid crystal capsule layer 300 and the second field-generating electrode 230 from each other, thereby preventing the first field-generating electrode 130 and the second field-generating electrode 230 from being electrically connected. In exemplary embodiments, the first insulating layer 250 may cover the entire surface of the second field-generating electrode 230. The first insulating layer 250 may include an organic insulating material or an inorganic insulating material. In an alternative exemplary embodiment, the first insulating layer 250 may be disposed between the liquid crystal capsule layer 300 and the first field-generating electrode 130, in which case, the first insulating layer 250 may cover the entire surface of the first field-generating electrode 130.

The liquid crystal capsule layer 300 may be disposed between the first substrate 110 and the second substrate 210. More specifically, the liquid crystal capsule layer 300 may be disposed between the first field-generating electrode 130 and the second field-generating electrode 230, and in response to the first insulating layer 250 being provided on the entire surface of the second field-generating electrode 230, the liquid crystal capsule layer 300 may be disposed between the first field-generating electrode 130 and the first insulating layer 250.

The liquid crystal capsule layer 300 may include the conductive buffer layer 310 and a plurality of liquid crystal capsules 330, which are distributed in the conductive buffer layer 310.

In an exemplary embodiment, the conductive buffer layer 310 may include a transparent or semitransparent material and may have conductivity.

In exemplary embodiments, the conductive buffer layer 310 may include an electrolyte solution with fluidity. The electrolyte solution is a solution in which an electrolyte is dissolved in a solvent and is thus ionized into anions and cations. In an exemplary embodiment, the electrolyte solution may be a solution in which an electrolyte such as sodium chloride, sulfuric acid, hydrochloric acid, sodium hydroxide, potassium hydroxide, sodium nitrate, or the like is dissolved in a solvent such as water or the like, for example, but the invention is not limited thereto. Various solvents and various electrolytes, other than those set forth herein, may be used to form the conductive buffer layer 310.

In other exemplary embodiments, the conductive buffer layer 310 may include a conductive polymer. In an exemplary embodiment, the conductive polymer may include at least one of polyaniline, poly(3,4-ethylenedioxythiophene) ("PEDOT"), polyacetylene, polypyrrole, polythiophene, and poly(sulfur nitride), but the invention is not limited thereto, for example.

Each of the liquid crystal capsules 330 may include a polymer layer 331 and liquid crystal molecules 333, which are surrounded by the polymer layer 331. The liquid crystal capsules 330 may be disorderly arranged in the conductive buffer layer 310 in arbitrary directions or may be uniformly aligned in the conductive buffer layer 310 in a particular direction.

The polymer layer 331 may form a space in which to accommodate the liquid crystal molecules 333. The polymer layer 331 may include a transparent polymer resin. In an exemplary embodiment, the transparent polymer resin may include at least one of polystyrene, polyethylene, polyurethane, poly chloride vinyl, polymethyl methacrylate, a polycarbonate epoxy resin, and polyvinyl acrylate, but the invention is not limited thereto, for example.

In the absence of an electric field in the liquid crystal capsule layer 300, the liquid crystal molecules 333 may be arranged in a particular manner such as a radial manner, a bipolar manner, a toroidal manner, a coaxial manner, or the like, or may be disorderly arranged in arbitrary directions. In an exemplary embodiment, the liquid crystal molecules 333 may be nematic liquid crystal molecules irregularly arranged in the space defined by the polymer layer 331, for example.

In exemplary embodiments, the liquid crystal molecules 333 may have positive dielectric anisotropy. In other exemplary embodiments, the liquid crystal molecules 333 may have negative dielectric anisotropy. In the description that follows, it is assumed that the liquid crystal molecules 333 have positive dielectric anisotropy, but the invention is not limited thereto.

In exemplary embodiments, the liquid crystal capsules 330 may have a diameter smaller than the wavelength of visible light so as to properly transmit light therethrough. The liquid crystal capsules 330 may have a diameter greater than the diameter of the liquid crystal molecules 333 and smaller than the shortest wavelength of visible light. Since visible light generally has a wavelength of about 380 nanometers ("nm") to about 770 nm, the liquid crystal capsules 330 may have a diameter of about 100 nm to about 380 nm, for example.

In response to the liquid crystal capsules 330 having a diameter of about 100 nm or less, only a relatively small amount of liquid crystal molecules 333 may be included in each of the liquid crystal capsules 330, and thus, the liquid crystal molecules 333 may not be able to be properly aligned along a direction of an electric field generated by voltages applied to the first field-generating electrode 130 and the second field-generating electrode 230. In response to the liquid crystal capsules 330 having a diameter of about 380 nm or larger, visible light having a wavelength of about 380 nm to about 770 nm may cause scattering at the boundaries of the liquid crystal capsules 330, and thus, an additional material for improving the extraction of light so as to prevent the scattering of light may be needed. In response to the liquid crystal capsules 330 having a diameter of about 10 nm to about 380 nm, visible light may pass through the liquid crystal capsules 330 without causing scattering at the boundaries of the liquid crystal capsules 330. Accordingly, even when the liquid crystal molecules 333 are not aligned in the liquid crystal capsule layer 300, visible light may pass through the liquid crystal capsule layer 300. Thus, an alignment film for adjusting an initial alignment state of the liquid crystal molecules 333 may not be needed. Therefore, the structure of the LCD device 1 may be simplified, and the fabrication of the LCD device 1 may also be simplified because additional processes, such as rubbing, for forming an alignment film are unnecessary.

The liquid crystal capsule layer 300 may have optical isotropic characteristics. That is, in response to no voltage being applied between the first field-generating electrode 130 and the second field-generating electrode 230, the liquid crystal capsule layer 300 may have optical isotropy three-dimensionally or two-dimensionally, and in the presence of an electric field between the first field-generating electrode 130 and the second field-generating electrode 230, the liquid crystal capsule layer 300 may cause birefringence to occur only in a direction of the electric field. Thus, in response to a voltage being applied, the liquid crystal capsule layer 300 becomes optically uniaxial, and thus, the transmittance of the liquid crystal capsule layer 300 becomes dependent on the viewing angle. That is, the transmittance of the liquid crystal capsule layer 300 may vary depending on whether an electric field generated between the first field-generating electrode 130 and the second field-generating electrode 230 being switched on or off. Also, in the absence of an electric field, the liquid crystal molecules 333 of the liquid crystal capsule layer 300 may dynamically rotate, and as a result, the response speed of the LCD device 1 may desirably increase.

Figure 2:
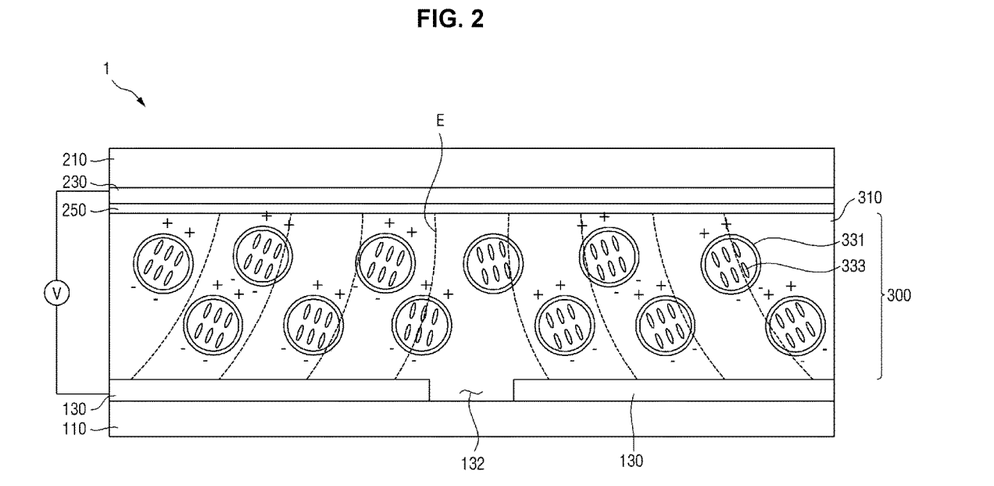
FIG. 2 is a cross-sectional view illustrating an operation of the LCD device of FIG. 1.

FIG. 2 is a cross-sectional view illustrating an operation of the LCD device of FIG. 1.

Referring to FIGS. 1 and 2, in response to no voltage being applied between the first field-generating electrode 130 and the second field-generating electrode 230, the liquid crystal molecules 333 in the liquid crystal capsule layer 300 may be irregularly arranged in arbitrary directions. Thus, the liquid crystal capsule layer 300 may have optically isotropic characteristics, and light provided by a backlight unit (not illustrated) may be blocked without penetrating the liquid crystal capsule layer 300. Therefore, the LCD device 1 may realize a black mode.

As illustrated in FIG. 2, in response to a voltage being applied between the first field-generating electrode 130 and the second field-generating electrode 230, an electric field E may be generated between the first field-generating electrode 130 and the second field-generating electrode 230. In an exemplary embodiment, the electric field E may be a vertical electric field, for example. The alignment of the liquid crystal molecules 333 may change according to the intensity of the electric field E, and as a result, light transmitted through the liquid crystal capsule layer 300 may be refracted or scattered. The polarization direction of light transmitted through the first substrate 110 or the second substrate 210 may vary depending on the voltage applied between the first field-generating electrode 130 and the second field-generating electrode 230. Thus, the LCD device 1 may realize a gray mode or a white mode.

The conductive buffer layer 310, which surrounds the liquid crystal capsules 330, has conductivity. Accordingly, in response to the electric field E being generated between the first field-generating electrode 130 and the second field-generating electrode 230, polarization may also occur in the conductive buffer layer 310. Since polarization occurs in parts of the conductive buffer layer 310 near the liquid crystal capsules 330, the formation of the electric field E may be expedited. As a result, the liquid crystal molecules 333 in the liquid crystal capsules 330 may be able to behave faster, and the response speed of the LCD device 1 may be further improved.

Since in the LCD device 1, the liquid crystal capsules 330 are surrounded by the conductive buffer layer 310, the driving voltage of the LCD device 1 may be reduced, compared to a case where the liquid crystal capsules 330 are surrounded by a nonconductive material. In an exemplary embodiment, in a case where the liquid crystal capsule layer 300 includes a nonconductive buffer layer and the liquid crystal capsules 330, the liquid crystal molecules 333 may be surrounded by a nonconductive material, for example. Accordingly, in order to properly align the liquid crystal molecules 333, the magnitude of a voltage applied between the first field-generating electrode 130 and the second field-generating electrode 230 may need to be relatively increased. Since in the LCD device 1, the liquid crystal capsules 330 are surrounded by the conductive buffer layer 310, the liquid crystal molecules 333 may be properly aligned even when the voltage applied between the first field-generating electrode 130 and the second field-generating electrode 230 is relatively low.

Since the silts 132 may be defined in the first field-generating electrode 130, the electric field E may be distorted near the slits 132. A multi-domain may be defined in which the alignment direction of the liquid crystal molecules 333 varies locally along a direction of the distorted electric field E. Due to the multi-domain, the viewing angle of the LCD device 1 may be improved.

Figure 3:
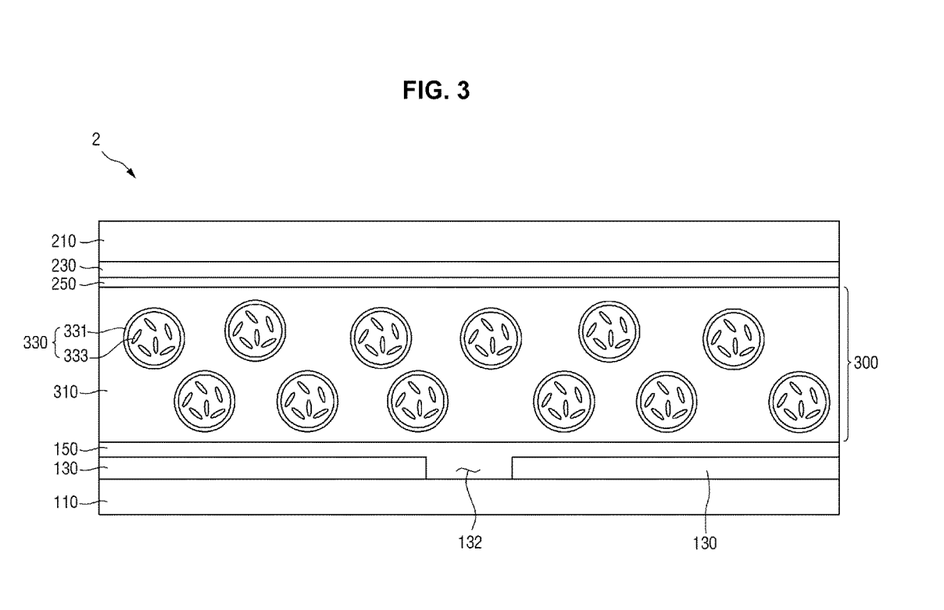
FIG. 3 is a cross-sectional view of an LCD device according to another exemplary embodiment of the invention.

FIG. 3 is a cross-sectional view of an LCD device according to another exemplary embodiment of the invention.

Referring to FIG. 3, an LCD device 2 is substantially identical or similar to the LCD device 1 of FIGS. 1 and 2 except that it further includes a second insulating layer 150, and thus will hereinafter be described, focusing mainly on differences with the LCD device 1.

The second insulating layer 150 may be disposed between a first field-generating electrode 130 and a liquid crystal capsule layer 300. In exemplary embodiments, the second insulating layer 150 may cover the entire surface of the first field-generating electrode 130. The second insulating layer 150 may be disposed between the liquid crystal capsule layer 300 and the first field-generating electrode 130 and may thus insulate the liquid crystal capsule layer 300 and the first field-generating electrode 130 from each other.

The second insulating layer 150 may include an organic insulating material or an inorganic insulating material.

Figure 4:
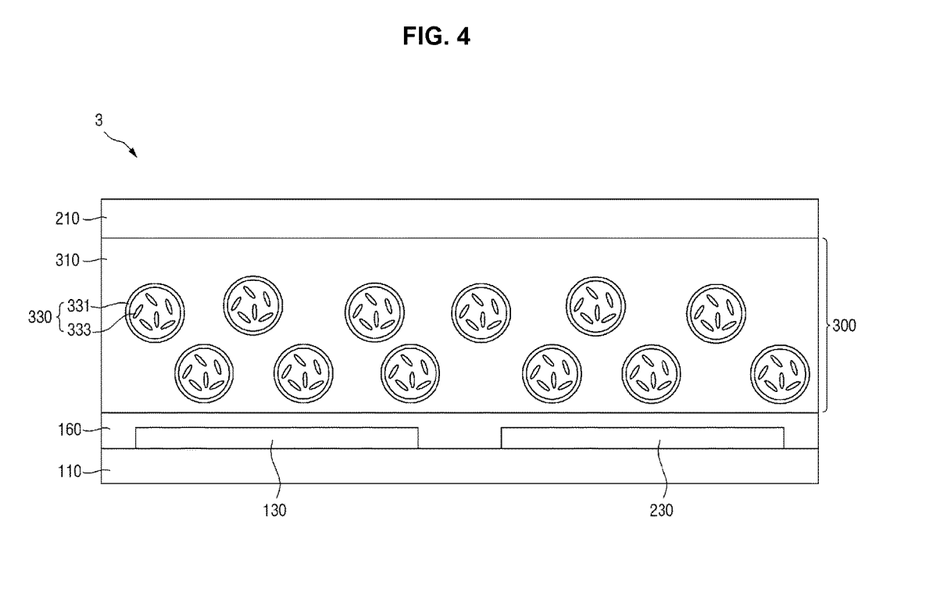
FIG. 4 is a cross-sectional view of an LCD device according to another exemplary embodiment of the invention.

FIG. 4 is a cross-sectional view of an LCD device according to another exemplary embodiment of the invention.

Referring to FIG. 4, an LCD device 3 is substantially identical or similar to the LCD device 1 of FIGS. 1 and 2 except that both a first field-generating electrode 130 and a second field-generating electrode 230 are disposed on a first surface of a first substrate 110, and thus will hereinafter be described, focusing mainly on differences with the LCD device 1.

In the LCD device 3, the first field-generating electrode 130 and the second field-generating electrode 230, which is spaced from the first field-generating electrode 130, may be disposed on the first surface of the first substrate 110 facing a second substrate 210. That is, the LCD device 3 may have an electrode structure in which a transverse electric field is applied so as to allow liquid crystal molecules 333 to respond and thus to display a grayscale image.

In an exemplary embodiment, the first field-generating electrode 130 and the second field-generating electrode 230 may be disposed on the same layer (e.g., on the first substrate 110), as illustrated in FIG. 3. That is, the LCD device 3 may be of an In-Plane Switching ("IPS") mode.

An insulating layer 160 may be disposed on the first field-generating electrode 130 and the second field-generating electrode 230. In an exemplary embodiment, the insulating layer 160 may include an organic insulating material or an inorganic insulating material.

The insulating layer 160 may cover both the first field-generating electrode 130 and the second field-generating electrode 230. The insulating layer 160 may be disposed between the liquid crystal capsule layer 300 and the first field-generating electrode 130 and between the liquid crystal capsule layer 300 and the second field-generating electrode 230 and may insulate the liquid crystal capsule layer 300 from the first field-generating electrode 130 and the second field-generating electrode 230, thereby preventing the first field-generating electrode 130 and the second field-generating electrode 230 from being electrically connected.

Figure 5:
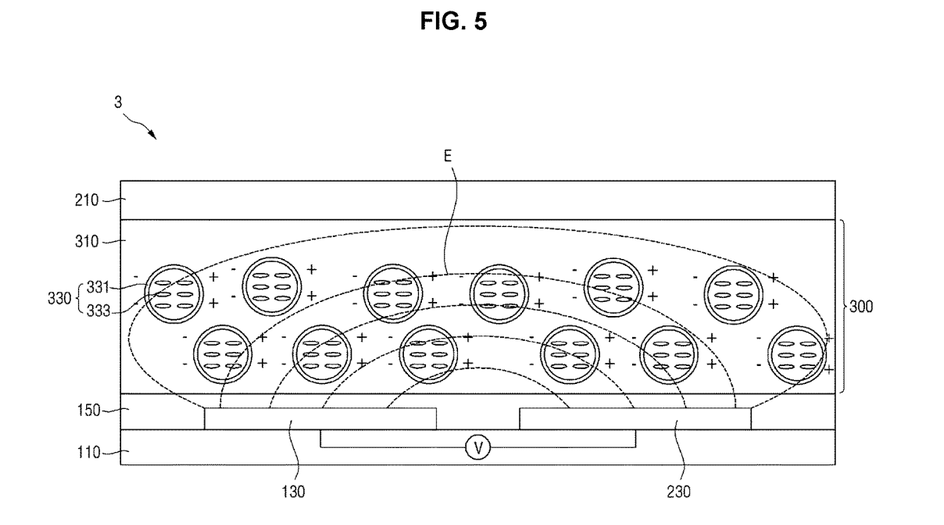
FIG. 5 is a cross-sectional view illustrating an operation of the LCD device of FIG. 4.

FIG. 5 is a cross-sectional view illustrating an operation of the LCD device of FIG. 4.

Referring to FIGS. 4 and 5, in response to no voltage being applied between the first field-generating electrode 130 and the second field-generating electrode 230, the liquid crystal molecules 333 in the liquid crystal capsule layer 300 may be irregularly arranged in arbitrary directions. Thus, the liquid crystal capsule layer 300 may have optically isotropic characteristics, and light provided by a backlight unit (not illustrated) may be blocked without penetrating the liquid crystal capsule layer 300. Therefore, the LCD device 3 may realize a black mode.

As illustrated in FIG. 5, in response to a voltage being applied between the first field-generating electrode 130 and the second field-generating electrode 230, an electric field E may be generated between the first field-generating electrode 130 and the second field-generating electrode 230. In an exemplary embodiment, the electric field E may be a transverse electric field, for example. The liquid crystal molecules 333 may be aligned along a direction of the electric field E, and thus, the LCD device 3 may display a gray or white image.

In response to the electric field E being generated, polarization may also occur in a conductive buffer layer 310. As a result, as mentioned above with reference to FIG. 2, the response speed of the LCD device 3 may be further improved, and the driving voltage of the LCD device 3 may be reduced.

Figure 6:
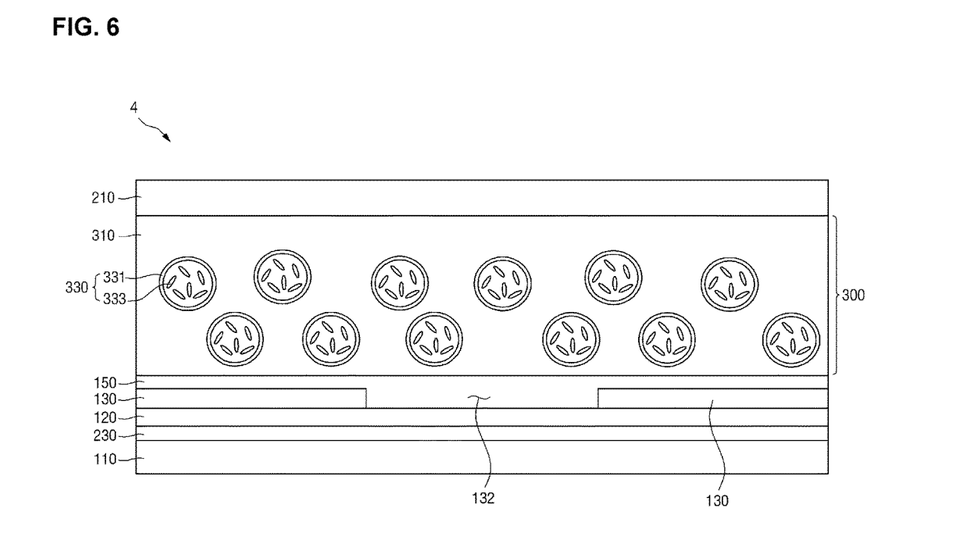
FIG. 6 is a cross-sectional view of an LCD device according to another exemplary embodiment of the invention.

FIG. 6 is a cross-sectional view of an LCD device according to another exemplary embodiment of the invention.

Referring to FIG. 6, an LCD device 4 is substantially identical or similar to the LCD device 1 of FIGS. 1 and 2 except that both a first field-generating electrode 130 and a second field-generating electrode 230 are disposed on a first surface of a first substrate 110, and is also substantially identical or similar to the LCD device 3 of FIGS. 4 and 5 except that the first field-generating electrode 130 and the second field-generating electrode 230 are disposed on different layers. Thus, the LCD device 4 will hereinafter be described, focusing mainly on differences with the LCD devices 1 and 3.

In the LCD device 4, the second field-generating electrode 230 may be disposed on the first surface of the first substrate 110 facing the second substrate 210, an insulating layer 120 may be disposed on the second field-generating electrode 230, and the first field-generating electrode 130 may be disposed on the insulating layer 120.

That is, the LCD device 4 may have an electrode structure in which a transverse electric field is applied so as to allow liquid crystal molecules 333 to respond and thus to display a grayscale image. The LCD device 4 may be of a Fringe-Field Switching ("FFS") mode in which the first field-generating electrode 130 and the second field-generating electrode 230 are disposed on different layers.

In exemplary embodiments, the second field-generating electrode 230 may be provided as a plate with no particular slits, and the first field-generating electrode 130 may be provided with slits 132. However, the invention is not limited to this.

The insulating layer 120 may be provided on the entire surface of the second field-generating electrode 230 and may insulate the second field-generating electrode 230 and the first field-generating electrode 130 from each other. The insulating layer 120 may include an organic insulating material or an inorganic insulating material.

In exemplary embodiments, an insulating layer 170 may be additionally provided on the first field-generating electrode 130. The insulating layer 170 may cover the entire surface of the first field-generating electrode 130 and may insulate the first field-generating electrode 130 and the liquid crystal capsule layer 300 from each other. In exemplary embodiments, the insulating layer 170 may not be provided.

Figure 7:
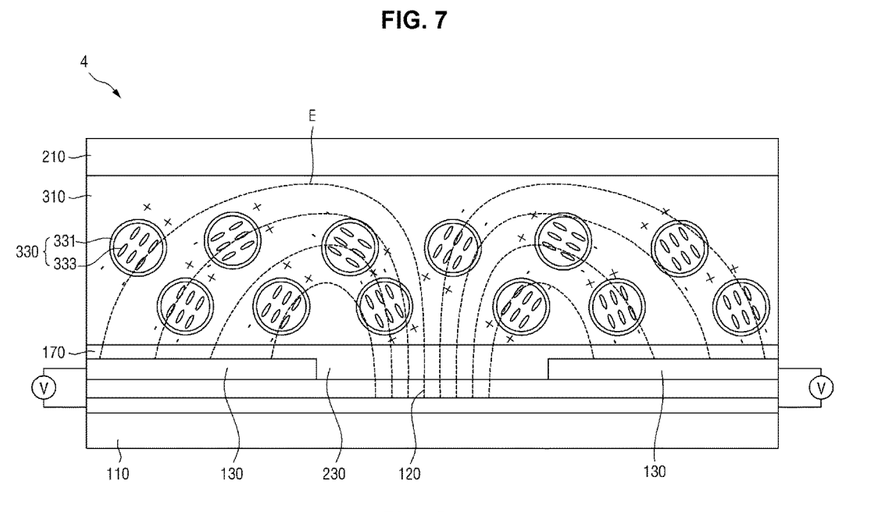
FIG. 7 is a cross-sectional view illustrating an operation of the LCD device of FIG. 6.

FIG. 7 is a cross-sectional view illustrating an operation of the LCD device of FIG. 6.

Referring to FIGS. 6 and 7, in response to no voltage being applied between the first field-generating electrode 130 and the second field-generating electrode 230, the liquid crystal capsule layer 300 may have optically isotropic characteristics, and the LCD device 4 may display a black image.

As illustrated in FIG. 7, in response to a voltage being applied between the first field-generating electrode 130 and the second field-generating electrode 230, an electric field E may be generated between the first field-generating electrode 130 and the second field-generating electrode 230. In an exemplary embodiment, the electric field E may be a vertical electric field, for example. The liquid crystal molecules 333 may be aligned along a direction of the electric field E, and the LCD device 4 may display a gray or white image.

In response to the electric field E being generated, polarization may also occur in a conductive buffer layer 310. As a result, as mentioned above with reference to FIG. 2, the response speed of the LCD device 4 may be further improved, and the driving voltage of the LCD device 4 may be reduced.

Figure 8:
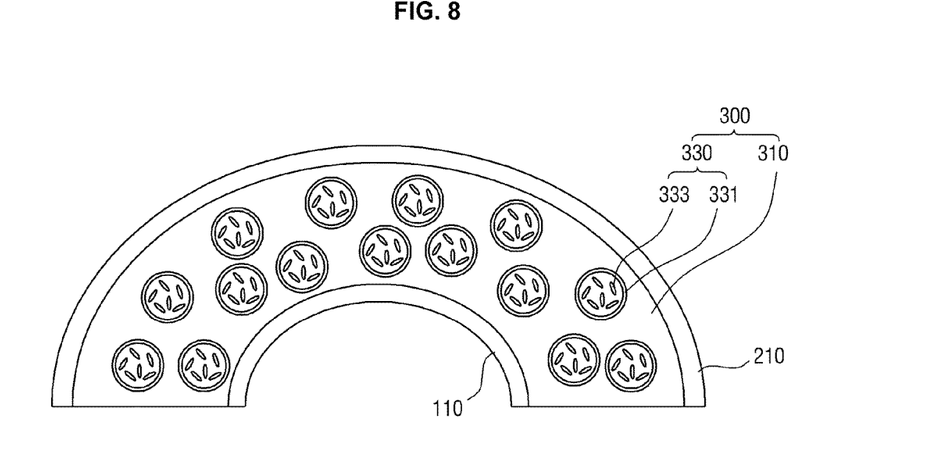
FIG. 8 is a cross-sectional view of a flexible LCD device as an exemplary embodiment of each of the LCD devices of FIGS. 1 to 7.

FIG. 8 is a cross-sectional view of a flexible LCD device as an exemplary embodiment of each of the LCD devices of FIGS. 1 to 7. In FIG. 8, only the first substrate 110, the second substrate 210, and the liquid crystal capsule layer 300 among other elements illustrated in FIGS. 1 to 7 are illustrated, and the first field-generating electrode 130 and the second field-generating electrode 230 are not illustrated for convenience.

Referring to FIG. 8, each of the LCD devices of FIGS. 1 to 7 may be implemented as a flexible LCD device. In an exemplary embodiment, the liquid crystal capsule layer 300 may be disposed between the first substrate 110 and the second substrate 210, for example. In the liquid crystal capsule layer 300, the liquid crystal molecules 333 may be disposed in each of the liquid crystal capsules 330, and the liquid crystal capsules 330 may have a diameter smaller than the wavelength of visible light. Thus, the liquid crystal capsule layer 300 may not be able to be influenced by visible light, and as a result, no light leakage may occur even in response to the flexible LCD device being bent. Also, since no additional alignment film needs to be provided, the probability of the occurrence of light leakage due to a misalignment between alignment films may be reduced.

Figure 9:
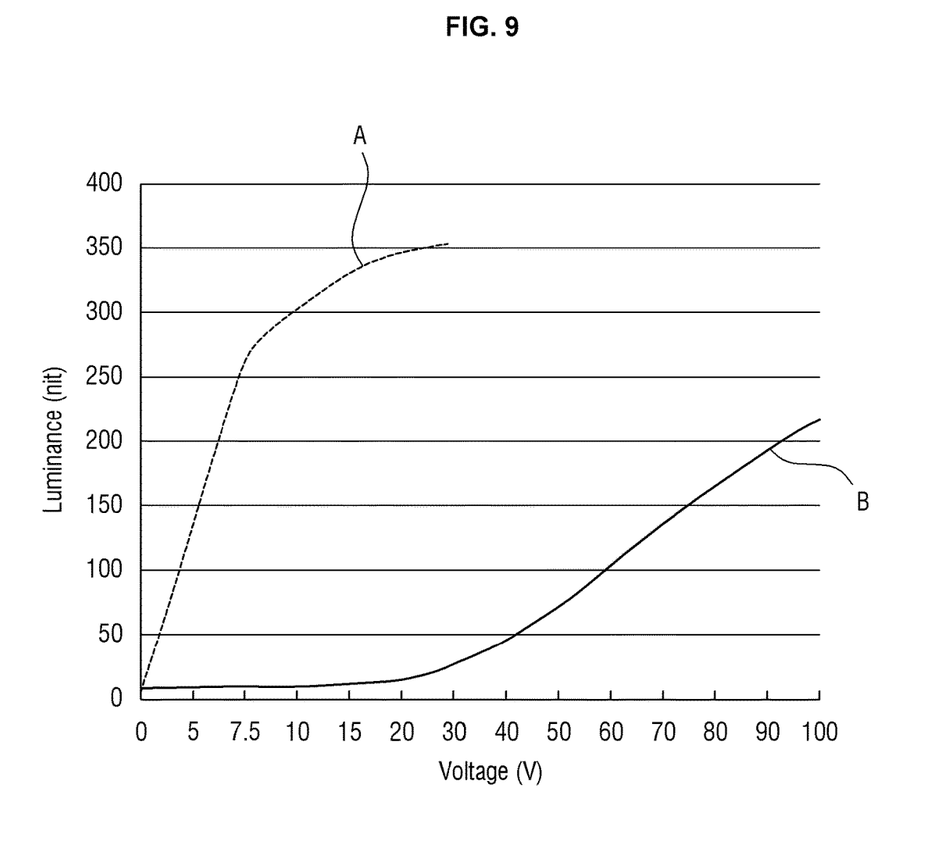
FIG. 9 is a graph showing the driving voltage and luminance of an LCD device according to an exemplary embodiment of the invention.

FIG. 9 is a graph showing the driving voltage and luminance of an LCD device according to an exemplary embodiment of the invention. Referring to FIG. 9, reference character A represents a curve showing the relationship between the driving voltage and the luminance of the LCD device 4 of FIG. 6, and reference character B represents a curve showing the relationship between the driving voltage and the luminance of an LCD device obtained by replacing the conductive buffer layer 310 of the LCD device 4 of FIG. 6 with a nonconductive buffer layer.

Referring to FIG. 9, in order for an LCD device with no conductive buffer layer in a liquid crystal capsule layer to achieve a target luminance of, for example, 100 nits, a driving voltage of about 60 volts (V) may be needed. An LCD device according to an exemplary embodiment of the invention, which has a conductive buffer layer in a liquid crystal capsule layer, may only need a driving voltage of about 5 V to achieve the target luminance of 100 nits. That is, an LCD device according to an exemplary embodiment of the invention has a conductive buffer layer in a liquid crystal capsule layer and may thus reduce a driving voltage.

The exemplary embodiments of the invention have been described with reference to the accompanying drawings. However, those skilled in the art will appreciate that many variations and modifications can be made to the disclosed embodiments without substantially departing from the principles of the invention. Therefore, the disclosed embodiments of the invention are used in a generic and descriptive sense only and not for purposes of limitation.

What is claimed is:

1. A liquid crystal display device, comprising:
a first substrate;
a second substrate facing the first substrate;
a liquid crystal capsule layer disposed between the first substrate and the second substrate;
a first field-generating electrode disposed on a first surface of the first substrate facing the second substrate;
a second field-generating electrode disposed on a first surface of the second substrate facing the first substrate; and
a first insulating layer disposed between the first field-generating electrode and the liquid crystal capsule layer or between the second field-generating electrode and the liquid crystal capsule layer,
wherein the liquid crystal capsule layer includes a conductive buffer layer and a plurality of liquid crystal capsules, which are distributed in the conductive buffer layer.

2. The liquid crystal display device of claim 1, wherein the conductive buffer layer includes an electrolyte solution.

3. The liquid crystal display device of claim 1, wherein the conductive buffer layer includes a conductive polymer.

4. The liquid crystal display device of claim 1, wherein each of the plurality of liquid crystal capsules includes liquid crystal molecules and a polymer layer, in which the liquid crystal molecules are included.

5. The liquid crystal display device of claim 1, wherein a diameter of the plurality of liquid crystal capsules ranges from about 10 nanometers to about 380 nanometers.

6. The liquid crystal display device of claim 1, wherein the first insulating layer is disposed between the second field-generating electrode and the liquid crystal capsule layer, and the liquid crystal display device further includes a second insulating layer, which is disposed between the first field-generating electrode and the liquid crystal capsule layer.

7. The liquid crystal display device of claim 1, wherein slits are defined in at least one of the first field-generating electrode and the second field-generating electrode.

8. A liquid crystal display device, comprising:
a first substrate;
a second substrate facing the first substrate;
a liquid crystal capsule layer disposed between the first substrate and the second substrate;
a first field-generating electrode disposed on a first surface of the first substrate facing the second substrate;
a second field-generating electrode disposed on the first surface of the first substrate and spaced from the first field-generating electrode; and
an insulating layer covering the first field-generating electrode and the second field-generating electrode,
wherein the liquid crystal capsule layer includes a conductive buffer layer and a plurality of liquid crystal capsules, which are distributed in the conductive buffer layer.

9. The liquid crystal display device of claim 8, wherein the conductive buffer layer includes an electrolyte solution.

10. The liquid crystal display device of claim 8, wherein the conductive buffer layer includes a conductive polymer.

11. The liquid crystal display device of claim 8, wherein each of the plurality of liquid crystal capsules includes liquid crystal molecules and a polymer layer, in which the liquid crystal molecules are included.

12. The liquid crystal display device of claim 8, wherein a diameter of the plurality of liquid crystal capsules ranges from about 10 nanometers to about 380 nanometers.

13. A liquid crystal display device, comprising:
a first substrate;
a second substrate facing the first substrate;
a liquid crystal capsule layer disposed between the first substrate and the second substrate;
an insulating layer disposed on a first surface of the first substrate facing the second substrate;
a first field-generating electrode disposed on the insulating layer; and
a second field-generating electrode disposed on a first surface of the second substrate facing the first substrate,
wherein the liquid crystal capsule layer includes a conductive buffer layer and a plurality of liquid crystal capsules, which are distributed in the conductive buffer layer.

14. The liquid crystal display device of claim 13, wherein the conductive buffer layer includes an electrolyte solution.

15. The liquid crystal display device of claim 13, wherein the conductive buffer layer includes a conductive polymer.

16. The liquid crystal display device of claim 13, wherein each of the plurality of liquid crystal capsules includes liquid crystal molecules and a polymer layer, in which the liquid crystal molecules are included.

17. The liquid crystal display device of claim 13, wherein a diameter of the plurality of liquid crystal capsules ranges from about 10 nanometers to about 380 nanometers.

18. The liquid crystal display device of claim 13, wherein slits are defined in the first field-generating electrode.

19. The liquid crystal display device of claim 1, wherein the conductive buffer layer has conductivity and polarization occurs therein in response to an electric field generated between the first field-generating electrode and the second field-generating electrode.

* * * * *